United States Patent

Oguro

(10) Patent No.: US 12,128,884 B2
(45) Date of Patent: Oct. 29, 2024

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventor: Chihiro Oguro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 17/979,322

(22) Filed: Nov. 2, 2022

(65) Prior Publication Data

US 2023/0202464 A1 Jun. 29, 2023

(30) Foreign Application Priority Data

Dec. 24, 2021 (JP) .................................. 2021-211380

(51) Int. Cl.
*B60W 30/095* (2012.01)
*B60W 30/09* (2012.01)

(52) U.S. Cl.
CPC ........ *B60W 30/09* (2013.01); *B60W 30/0956* (2013.01); *B60W 2554/4041* (2020.02); *B60W 2554/80* (2020.02)

(58) Field of Classification Search
CPC ............ B60W 30/09; B60W 30/0956; B60W 2554/4041; B60W 2554/80; B60W 40/06; B60W 2552/05; B60W 2556/40; B60W 50/0225; B60W 50/038; B60W 2050/021; B60W 2556/50; B60W 30/14; B60W 30/18; B60W 30/18109; B60W 30/18145
See application file for complete search history.

(56) References Cited

U.S. PATENT DOCUMENTS

| | | | |
|---|---|---|---|
| 9,260,059 B2 | 2/2016 | Rayes et al. | |
| 10,037,689 B2 * | 7/2018 | Taylor | ................. G05D 1/0285 |
| 2015/0307023 A1 | 10/2015 | Rayes et al. | |
| 2018/0307238 A1 * | 10/2018 | Wisniowski | ............ G01S 17/86 |

FOREIGN PATENT DOCUMENTS

| | | | | |
|---|---|---|---|---|
| CA | 3067177 A1 * | 8/2016 | ............ | B60W 30/10 |
| CN | 109720335 A * | 5/2019 | | |
| DE | 102016122215 A1 * | 5/2018 | ......... | B62D 15/0285 |
| JP | 2017-515227 A | 6/2017 | | |
| WO | 2015/164034 A1 | 10/2015 | | |

* cited by examiner

*Primary Examiner* — Justin Holmes
(74) *Attorney, Agent, or Firm* — Thomas | Horstemeyer, LLP

(57) ABSTRACT

The present invention provides a vehicle control apparatus that controls traveling of a vehicle, comprising: a detector configured to detect a surrounding situation of the vehicle; a control unit configured to activate driving assistance of the vehicle in a case where a positional relationship between a target object that has been detected by the detector and the vehicle satisfies an activation condition; an identification unit configured to identify a traveling position of the vehicle; and a determination unit configured to determine reliability of the traveling position of the vehicle that has been identified by the identification unit, wherein the control unit changes the activation condition in accordance with the reliability that has been determined by the determination unit.

9 Claims, 5 Drawing Sheets

| IDENTIFICATION LEVEL (RELIABILITY) | DEFINITION | MAP MATCHING STATE |
|---|---|---|
| 1 | MATCHING ERROR IS ONE-LANE LEVEL (IDENTIFY TRAVELING LANE OF VEHICLE) | SINGLE |
| 2 | MATCHING ERROR IS TWO-LANE LEVEL (IDENTIFY SECOND LANE AS CANDIDATE OF VEHICLE TRAVELING LANE) | MULTI |
| 3 | MATCHING ERROR IS TRAVELING COURSE/ROAD LEVEL (IDENTIFY ROAD ON WHICH VEHICLE IS TRAVELING (IMPOSSIBLE TO IDENTIFY LANE)) | MULTI |
| 4 | MATCHING ERROR EXCEEDS TRAVELING COURSE/ROAD LEVEL | OFF-ROAD |

VEHICLE CONTROL APPARATUS, VEHICLE CONTROL METHOD, AND STORAGE MEDIUM

CROSS-REFERENCE TO RELATED APPLICATION(S)

This application claims priority to and the benefit of Japanese Patent Application No. 2021-211380 filed on Dec. 24, 2021, the entire disclosure of which is incorporated herein by reference.

BACKGROUND OF THE INVENTION

Field of the Invention

The present invention relates to a technique of controlling a vehicle.

Description of the Related Art

Japanese Patent Laid-Open No. 2017-515227 discloses a forward collision warning system for a vehicle. Such a forward collision warning system does not output a warning, in a case where a target object that has been detected by a forward vehicle sensor matches a target object that is accumulated in a database of incorrect warning at a position of a vehicle that has been detected by a global positioning system (GPS), and outputs a warning, in a case where the target object does not match any target objects that are accumulated in the database.

In the global positioning system (GPS, GNSS), a traveling position (traveling road) of a vehicle cannot be accurately detected due to a reception state of signals from a satellite, a road structure, or the like, in some cases. In such cases, only by applying the technique disclosed in Japanese Patent Application Laid-Open No. 2017-515227, the database is referred to, based on the position of the vehicle that has been incorrectly detected by the global positioning system, and the driving assistance such as a warning may malfunction.

SUMMARY OF THE INVENTION

The present invention provides, for example, a technique capable of appropriately activating driving assistance of a vehicle to improve the safety of the vehicle.

According to one aspect of the present invention, there is provided a vehicle control apparatus that controls traveling of a vehicle, comprising: a detector configured to detect a surrounding situation of the vehicle; a control unit configured to activate driving assistance of the vehicle in a case where a positional relationship between a target object that has been detected by the detector and the vehicle satisfies an activation condition; an identification unit configured to identify a traveling position of the vehicle; and a determination unit configured to determine reliability of the traveling position of the vehicle that has been identified by the identification unit, wherein the control unit changes the activation condition in accordance with the reliability that has been determined by the determination unit.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 1:
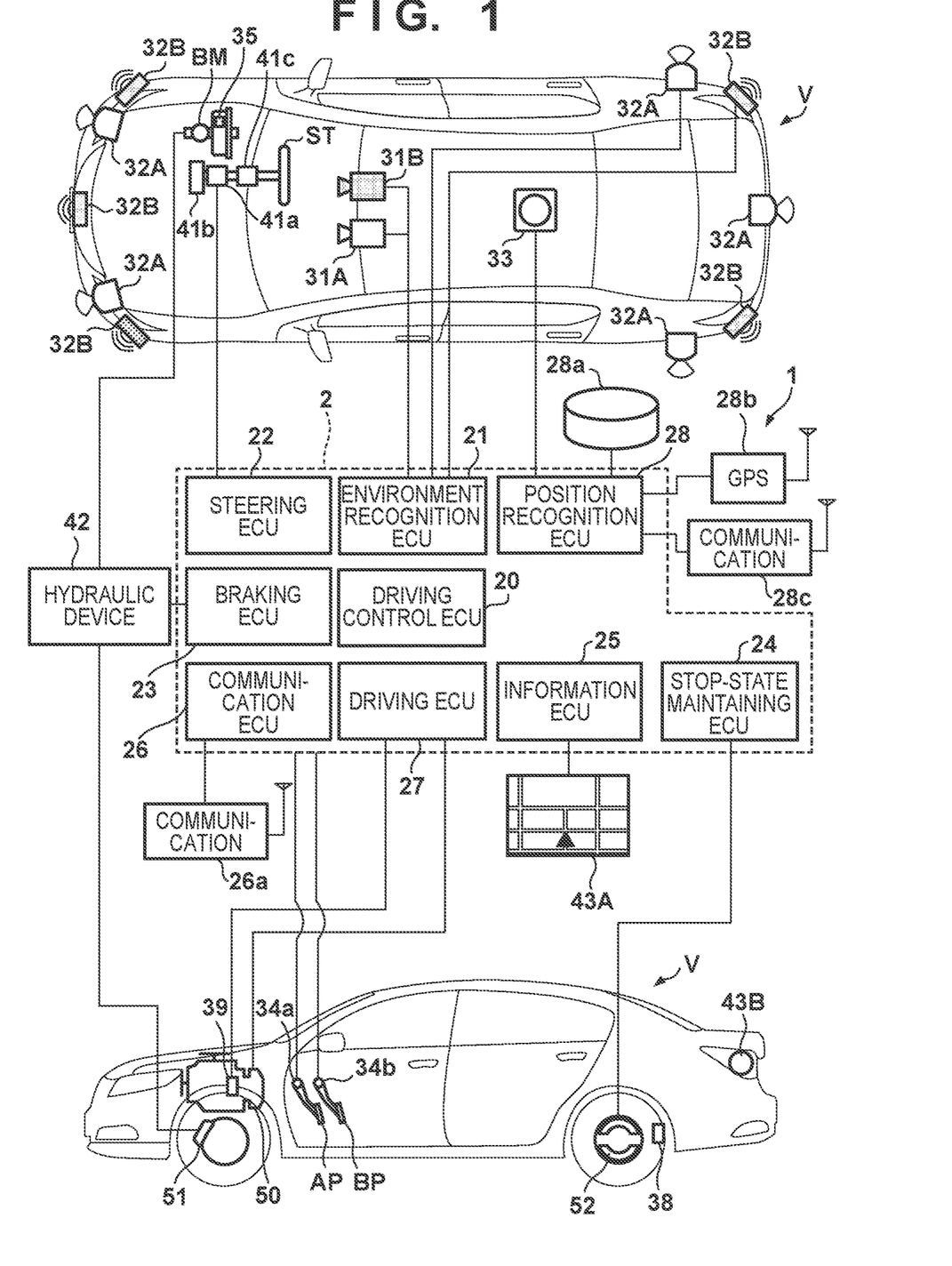
FIG. 1 is a block diagram illustrating a vehicle and a control apparatus thereof.

A first embodiment according to the present invention will be described. FIG. 1 is a block diagram of a vehicle V and a control apparatus 1 thereof according to an embodiment of the present invention. In FIG. 1, an outline of the vehicle V is illustrated in a plan view and in a side view. The vehicle V in the present embodiment is, as an example, a sedan-type four-wheeled passenger vehicle, and may be, for example, a parallel hybrid vehicle. In this case, a power plant 50, which is a travel driving unit that outputs driving force for rotating driving wheels of the vehicle V, can include an internal combustion engine, a motor, and an automatic transmission. The motor can be used as a drive source for accelerating the vehicle V, and can also be used as a generator at the time of deceleration or the like (regenerative braking). Note that the vehicle V is not limited to the four-wheeled vehicle, and may be a straddle type vehicle (motorcycle or three-wheeled vehicle) or a large vehicle such as a truck or a bus.

A configuration of the control apparatus 1, which is an apparatus mounted on the vehicle V, will be described with reference to FIG. 1. The control apparatus 1 can include an information processing unit 2 including a plurality of electronic control units (ECUs) 20 to 28 capable of communicating with one another. Each ECU includes a processor represented by a central processing unit (CPU), a storage device such as a semiconductor memory, an interface with an external device, and the like. The storage device stores a program to be executed by the processor, data to be used for processing by the processor, and the like. Each ECU may include a plurality of processors, storage devices, interfaces, and the like. Note that the number of ECUs and functions to be handled can be designed as appropriate, and may be subdivided or integrated, as compared with the present embodiment. Note that, in FIG. 1, names of representative functions of the ECUs 20 to 28 are given. For example, the ECU 20 is described as a "driving control ECU".

The ECU 20 conducts control related to driving control of the vehicle V including driving assistance of the vehicle V. In the present embodiment, the ECU 20 controls driving (acceleration of the vehicle V by the power plant 50 or the like), steering, and braking of the vehicle V. In addition, the ECU 20 is capable of conducting driving assistance control such as a collision warning, collision reduction braking, and lane deviation prevention, for example, in manual driving.

In the collision warning, when a possibility of a collision with a target object (an obstacle or another vehicle) in the traveling direction increases, a warning is issued to the driver to notify the driver of such an increase so as to support collision avoidance. The collision reduction braking assists the collision avoidance by controlling a brake device 51 to conduct deceleration assistance of the vehicle V, when the possibility of a collision with a target object in the traveling direction increases. The lane deviation prevention is for controlling an electric power steering device 41 to assist lane deviation avoidance, when the possibility that the vehicle V deviates from the traveling lane increases.

The ECU 21 is an environment recognition unit that recognizes the travel environment of the vehicle V, based on detection results of the detection units 31A, 31B, 32A, and 32B, which detect the surrounding situations of the vehicle V. In the present embodiment, the ECU 21 is capable of detecting a position of a target object (for example, an obstacle or another vehicle) in the surroundings of the vehicle V, based on a detection result by at least one of the detection units 31A, 31B, 32A, and 32B.

The detection units 31A, 31B, 32A, and 32B are sensors capable of detecting a target object in the surroundings of the vehicle V (self-vehicle). The detection units 31A and 31B are cameras that image a forward side of the vehicle V (hereinafter, the detection units will be referred to as the camera 31A and the camera 31B, in some cases), and are attached to the vehicle interior side of the windshield on a front part of the roof of the vehicle V. By analyzing the images that have been captured by the camera 31A and the camera 31B, it is possible to extract a contour of a target object or extract a division line (white line or the like) between lanes on a road.

The detection unit 32A is a light detection and ranging (LiDAR) (hereinafter, referred to as a LiDAR 32A, in some cases), detects a target object in the surroundings of the vehicle V, and detects (measures) a distance to the target object and a direction (azimuth) to the target object. In the example illustrated in FIG. 1, five LiDARs 32A are provided, including one at each corner portion of a front part of the vehicle V, one at the center of a rear part of the vehicle V, and one at each lateral side of the rear part of the vehicle V. In addition, the detection unit 32B is a millimeter-wave radar (hereinafter, referred to as the radar 32B), detects a target object in the surroundings of the vehicle V by use of radio waves, and detects (measures) a distance to the target object and a direction (azimuth) to the target object. In the example illustrated in FIG. 1, five radars 32B are provided, including one at the center of the front part of the vehicle V, one at each corner portion of the front part of the vehicle V, and one at each corner portion of the rear part of the vehicle V.

The ECU 22 is a steering control unit that controls the electric power steering device 41. The electric power steering device 41 includes a mechanism that steers front wheels in response to a driver's driving operation (steering operation) on a steering wheel ST. The electric power steering device 41 includes a driving unit 41a including a motor that exerts driving force for assisting a steering operation or automatically steering the front wheels (referred to as steering assist torque, in some cases), a steering angle sensor 41b, a torque sensor 41c for detecting steering torque burdened by the driver (referred to as steering burden torque to be distinguished from steering assist torque).

The ECU 23 is a braking control unit that controls a hydraulic device 42. The driver's braking operation on a brake pedal BP is converted into hydraulic pressure in a brake master cylinder BM, and is transmitted to the hydraulic device 42. The hydraulic device 42 is an actuator capable of controlling the hydraulic pressure of hydraulic oil to be supplied to the brake device (for example, a disc brake device) 51 provided on each of the four wheels, based on the hydraulic pressure that has been transmitted from the brake master cylinder BM, and the ECU 23 controls the driving of an electromagnetic valve and the like included in the hydraulic device 42. The ECU 23 is also capable of turning on brake lamps 43B at the time of braking. This enables the following vehicle to give more attention to the vehicle V.

The ECU 23 and the hydraulic device 42 are capable of constituting an electric servo brake. The ECU 23 is capable of controlling, for example, the distribution of the braking force by the four brake devices 51 and the braking force by the regenerative braking of the motor included in the power plant 50. The ECU 23 is also capable of achieving an ABS function, traction control, and a posture control function of the vehicle V, based on detection results of wheel speed sensors 38 provided for the respective four wheels, a yaw rate sensor (not illustrated), and a pressure sensor 35 for detecting the pressure in the brake master cylinder BM.

The ECU 24 is a stop-state maintaining control unit that controls electric parking brake devices 52 provided on the rear wheels. The electric parking brake devices 52 each include a mechanism for locking the rear wheel. The ECU 24 is capable of controlling locking and unlocking of the rear wheels by use of the electric parking brake devices 52.

The ECU 25 is an in-vehicle notification control unit that controls an information output device 43A, which notifies the vehicle inside of information. The information output device 43A includes, for example, a display device provided on a head-up display or an instrument panel, or a sound output device. A vibration device may additionally be included. The ECU 25 causes the information output device 43A to output, for example, various types of information such as a vehicle speed and an outside air temperature, information such as route guidance, and information regarding a state of the vehicle V.

The ECU 26 includes a communication device 26a, which performs wireless communication. The communication device 26a is capable of exchanging information on wireless communication with a target object having a communication function. Examples of the target object having a communication function include a vehicle (vehicle-to-vehicle communication), a fixed facility such as a traffic light or a traffic monitor (road-to-vehicle communication), and a person (pedestrian or bicycle) carrying a mobile terminal such as a smartphone. In addition, by accessing a server or the like on the Internet through the communication device 26a, the ECU 26 is capable of acquiring various types of information such as road information.

The ECU 27 is a driving control unit that controls the power plant 50. In the present embodiment, one ECU 27 is assigned to the power plant 50, but one ECU may be assigned to each the internal combustion engine, the motor, and the automatic transmission. The ECU 27 controls the output of the internal combustion engine or the motor, or switches the gear ratio of the automatic transmission in accordance with, for example, a driver's driving operation or a vehicle speed that has been detected by an operation detection sensor 34a provided on an accelerator pedal AP or an operation detection sensor 34b provided on the brake pedal BP. Note that the automatic transmission includes a rotation speed sensor 39, which detects the rotation speed of an output shaft of the automatic transmission, as a sensor for detecting a traveling state of the vehicle V. The vehicle speed of the vehicle V can be calculated from a detection result of the rotation speed sensor 39.

The ECU 28 is a position recognition unit that recognizes a current position and a course of the vehicle V. The ECU 28 controls a gyro sensor 33, a global positioning system (GPS) sensor 28b, and a communication device 28c, and performs information processing on a detection result or a communication result. The gyro sensor 33 detects a rotational motion (yaw rate) of the vehicle V. It is possible to determine the course of the vehicle V from the detection result or the like of the gyro sensor 33. The GPS sensor 28b detects the current position of the vehicle V. The communication device 28c performs wireless communication with a server that provides map information and traffic information, and acquires these pieces of information. It is possible to store the map information with high accuracy in a database 28a, so the ECU 28 is capable of identifying the position of the vehicle V on a lane with higher accuracy, based on such map information or the like. In addition, the vehicle V may include a speed sensor for detecting the speed of the vehicle V, an acceleration sensor for detecting the acceleration of the vehicle V, and a lateral acceleration sensor (lateral G sensor) for detecting the lateral acceleration of the vehicle V.

Figure 2:
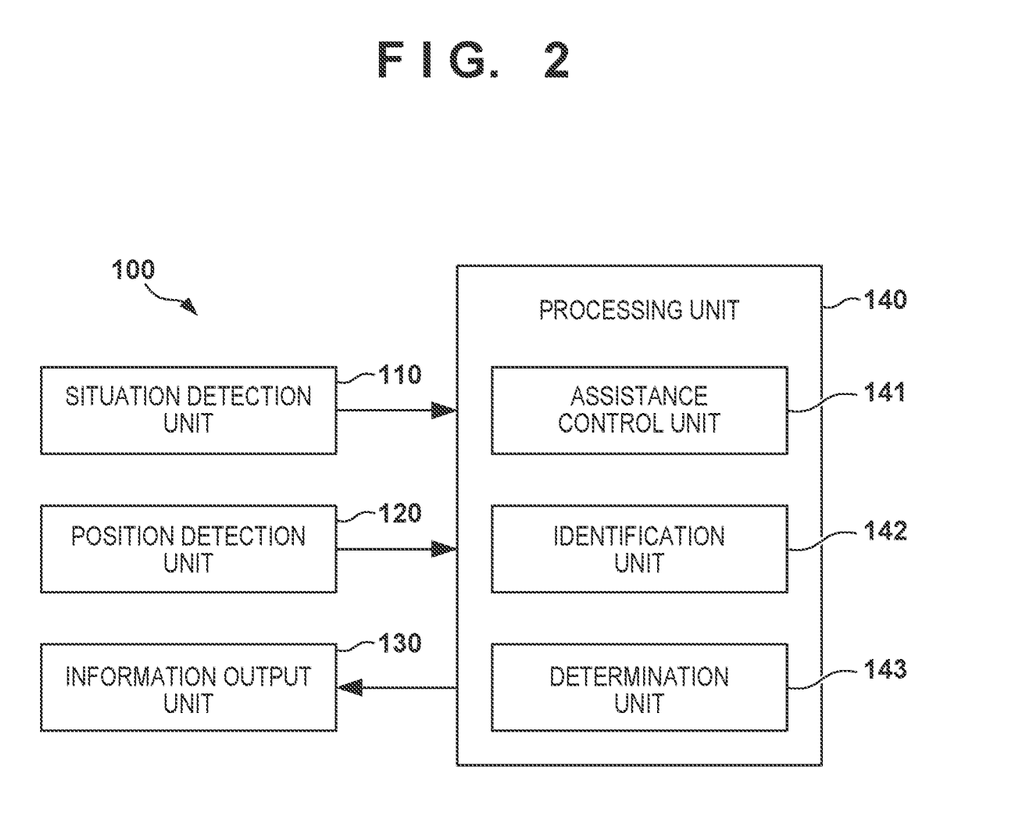
FIG. 2 is a block diagram illustrating a configuration of a vehicle control apparatus.

FIG. 2 is a block diagram illustrating a configuration of a vehicle control apparatus 100 according to the present embodiment. The vehicle control apparatus 100 is an apparatus that controls traveling of the vehicle V, and can include, for example, a situation detection unit (situation detector) 110, a position detection unit (position detector) 120, an information output unit (information output device) 130, and a processing unit (processor) 140. The situation detection unit 110, the position detection unit 120, the information output unit 130, and the processing unit 140 are communicably connected to one another through a system bus.

The situation detection unit 110 is, for example, a detection unit (the cameras 31A and 31B, the LiDAR 32A, or the radar 32B) illustrated in FIG. 1, and detects a surrounding situation of the vehicle V. In the present embodiment, the situation detection unit 110 detects a target object (for example, an obstacle or another vehicle) in a traveling direction of (for example, forward) the vehicle V. The position detection unit 120 is, for example, the GPS sensor 28b illustrated in FIG. 1, and detects a current position and a traveling direction of the vehicle V. The position detection unit 120 may include a gyro sensor 33, in addition to the GPS sensor 28b. Further, the information output unit 130 is, for example, the information output device 43A illustrated in FIG. 1, and notifies an occupant (for example, the driver) of the vehicle of various types of information by displaying on a display, a sound output, or the like. In the present embodiment, the information output unit 130 can be used for warning (notifying) the driver that the possibility of a collision with a target object (an obstacle or another vehicle) in the traveling direction has increased.

The processing unit 140 is constituted by a computer including a processor represented by a central processing unit (CPU), a storage device such as a semiconductor memory, an interface with an external device, and the like, and can function as a part of the ECU of the information processing unit 2 illustrated in FIG. 1. In the storage device, a program for providing driving assistance (driving assistance program) for the driver of the vehicle V is stored, and the processing unit 140 can read and execute the driving assistance program stored in the storage device. The processing unit 140 in the present embodiment can include an assistance control unit 141, an identification unit 142, and a determination unit 143.

The assistance control unit 141 activates the driving assistance for the vehicle V, in a case where the positional relationship between the target object that has been detected by the situation detection unit 110 and the vehicle V satisfies an activation condition. For example, the assistance control unit 141 calculates an index indicating the positional relationship between the target object that has been detected by the situation detection unit 110 and the vehicle V, and activates the driving assistance, in a case where the activation condition that the index has reached a threshold is satisfied. In the present embodiment, examples of the driving assistance include a collision warning and/or collision reduction braking. As described above, the collision warning is for notifying the driver that the possibility of a collision with the target object that has been detected by the situation detection unit 110 has increased (deceleration of the vehicle V is necessary). The collision reduction braking is for controlling the brake device 51 to conduct the deceleration assistance of the vehicle V, when the possibility of a collision with the target object that has been detected by the situation detection unit 110 increases. In addition, as an index, time-to-collision (TTC) is applicable. In this case, the assistance control unit 141 activates the collision warning and/or the collision reduction braking as the driving assistance, when the time-to-collision reaches a threshold, that is, when the time-to-collision becomes equal to or shorter than the threshold.

The identification unit 142 performs a known map matching process, based on the current position of the vehicle V that has been detected by the position detection unit 120 and the map information stored in the database 28a, and thus identifies the traveling position of the vehicle V. That is, it may be understood that the identification unit 142 conducts map matching between the current position of the vehicle V that has been detected by the position detection unit 120 and the map information stored in the database 28a, and thus identifies a road (traveling road) on which the vehicle V is traveling as the traveling position of the vehicle V.

Figure 3:
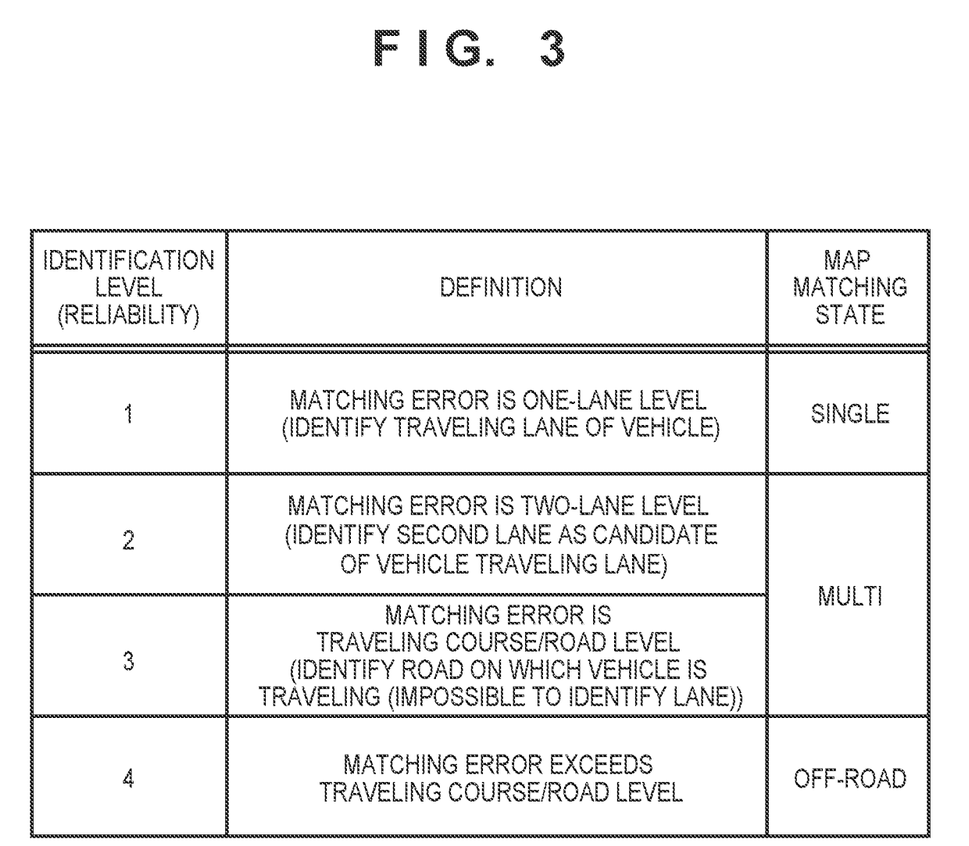
FIG. 3 is a diagram illustrating an example of reliability (identification level) of a traveling position of the vehicle.

The determination unit 143 determines (calculates) the reliability of the traveling position of vehicle V that has been identified by the identification unit 142. In the present embodiment, the determination unit 143 determines the reliability of the traveling position of the vehicle V as an identification level of the road on which the vehicle V is traveling. FIG. 3 is a diagram illustrating an example of the reliability (identification level) of the traveling position of the vehicle V. As illustrated in FIG. 3, the determination unit 143 can determine the identification level of the traveling position (traveling road or traveling lane) of the vehicle V that has been identified by the identification unit 142 in four levels (1 to 4). The identification level 1 indicates a case where a matching error is a one-lane level, and the identification unit 142 has identified one lane on the map as the traveling lane of the vehicle V (single matching). In addition, the identification levels 2 and 3 indicate cases where the matching error is two or more-lane levels, and the identification unit 142 has identified two or more lanes on the map as candidates for the traveling lane of the vehicle V (multi-matching). Also in the multi-matching, the levels can be classified into the identification level 2, which is a two-lane level in the matching error, and the identification level 3, which is a traveling course and road level (for example, three or more-lane levels) in the matching error. Furthermore, the identification level 4 indicates a case where the matching error exceeds the traveling course and road level (off-road matching). The off-road matching may be understood as a case where the identification unit 142 has been incapable of identifying the traveling road (a candidate for the traveling lane) of the vehicle V.

The situation detection unit 110, by the way, detects an overhead structure that crosses over the road (for example, a bridge, a monorail, or the like) as the target object, in some cases. There is a very low possibility that the vehicle V collides with such an overhead structure. However, in a case where the overhead structure is detected by the situation detection unit 110 and the positional relationship between the overhead structure and the vehicle V satisfies the activation condition, the assistance control unit 141 may activate the driving assistance such as the collision warning or the collision reduction braking. That is, the assistance control unit 141 may activate the driving assistance even for a target object that is not originally the one for activating the driving assistance. For this reason, the assistance control unit 141 determines whether the vehicle V is traveling in an area (road) where the activation of the driving assistance is to be restricted (suppressed), based on the traveling position (traveling road) of the vehicle V that has been identified by the identification unit 142, and changes the activation condition of the driving assistance in accordance with whether the vehicle V is traveling in such an area. Information (database) of the area where the activation of the driving assistance is to be restricted may be stored in the storage device of the processing unit 140, or may be acquired from a server via the communication device 26*a*. Note that in the following, the area where the activation of the driving assistance is to be restricted will be referred to as an "activation restricted area", in some cases.

In the case where the activation condition of the driving assistance is changed in accordance with whether the traveling position of the vehicle V is located within the activation restricted area, it is important for the identification unit 142 to identify the traveling position of the vehicle V. However, there are some cases where the position detection unit 120 such as a GPS sensor is incapable of accurately detecting the current position of the vehicle V due to a reception state of signals from a satellite, a road structure, or the like. In those cases, it is difficult for the identification unit 142 to accurately identify the traveling position of the vehicle V. For this reason, it is incorrectly recognized that the traveling position of the vehicle V is located within the activation restricted area, and incorrect activation of the driving assistance of the vehicle V may occur. Hence, as described above, the vehicle control apparatus 100 (the processing unit 140) in the present embodiment includes the determination unit 143, which determines the reliability (identification level) of the traveling position of the vehicle V that has been identified by the identification unit 142. Then, the assistance control unit 141 changes the activation condition of the driving assistance in accordance with the reliability (identification level) that has been determined by the determination unit 143. For example, in a case where the traveling position (traveling road) of the vehicle V has not been identified by the identification unit 142, the assistance control unit 141 can change the activation condition of the driving assistance so that the activation of the driving assistance is restricted (suppressed), as compared with a case where the traveling position of the vehicle V has been identified.

Figure 4:
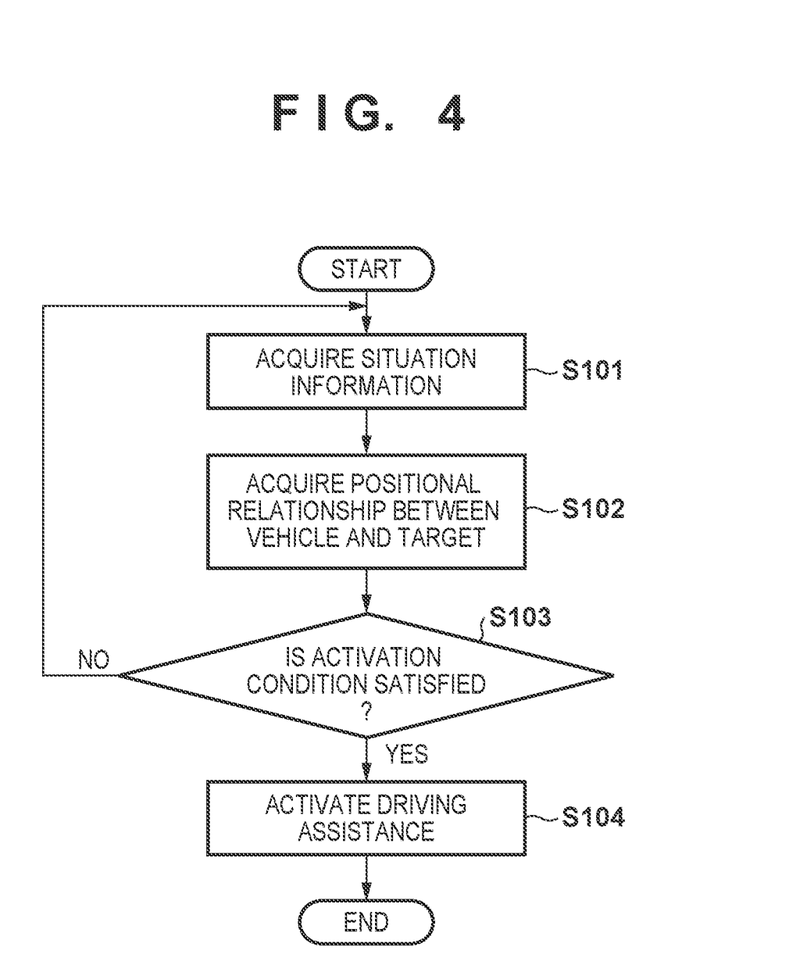
FIG. 4 is a flowchart illustrating a driving assistance process.

Next, a driving assistance process in the present embodiment will be described. FIG. 4 is a flowchart illustrating the driving assistance process in the present embodiment. The flowchart of FIG. 4 can be performed by the processing unit 140 (the assistance control unit 141), when the driving assistance program is executed in the vehicle control apparatus 100.

In step S101, the processing unit 140 acquires, from the situation detection unit 110, information (situation information) indicating the surrounding situation of the vehicle V that has been detected by the situation detection unit 110. Next, in step S102, the processing unit 140 identifies a target object included in the situation information acquired in step S101, and obtains a positional relationship between the vehicle V and the target object. In the present embodiment, the processing unit 140 obtains a time-to-collision (TTC) as an index indicating the positional relationship between the target object that has been detected by the situation detection unit 110 and the vehicle V.

In step S103, the processing unit 140 determines whether the positional relationship between the vehicle V and the target object obtained in step S102 satisfies an activation condition that is a condition for activating the driving assistance. For example, the processing unit 140 determines whether the activation condition that the time-to-collision obtained as the index indicating the positional relationship between the vehicle V and the target object has reached a threshold is satisfied. In a case where the activation condition is not satisfied, the process returns to step S101. On the other hand, in a case where the activation condition is satisfied, the process proceeds to step S104, and the processing unit 140 activates the driving assistance of the vehicle V. In the present embodiment, a collision warning and/or collision reduction braking is applied as the driving assistance of the vehicle V.

Figure 5:
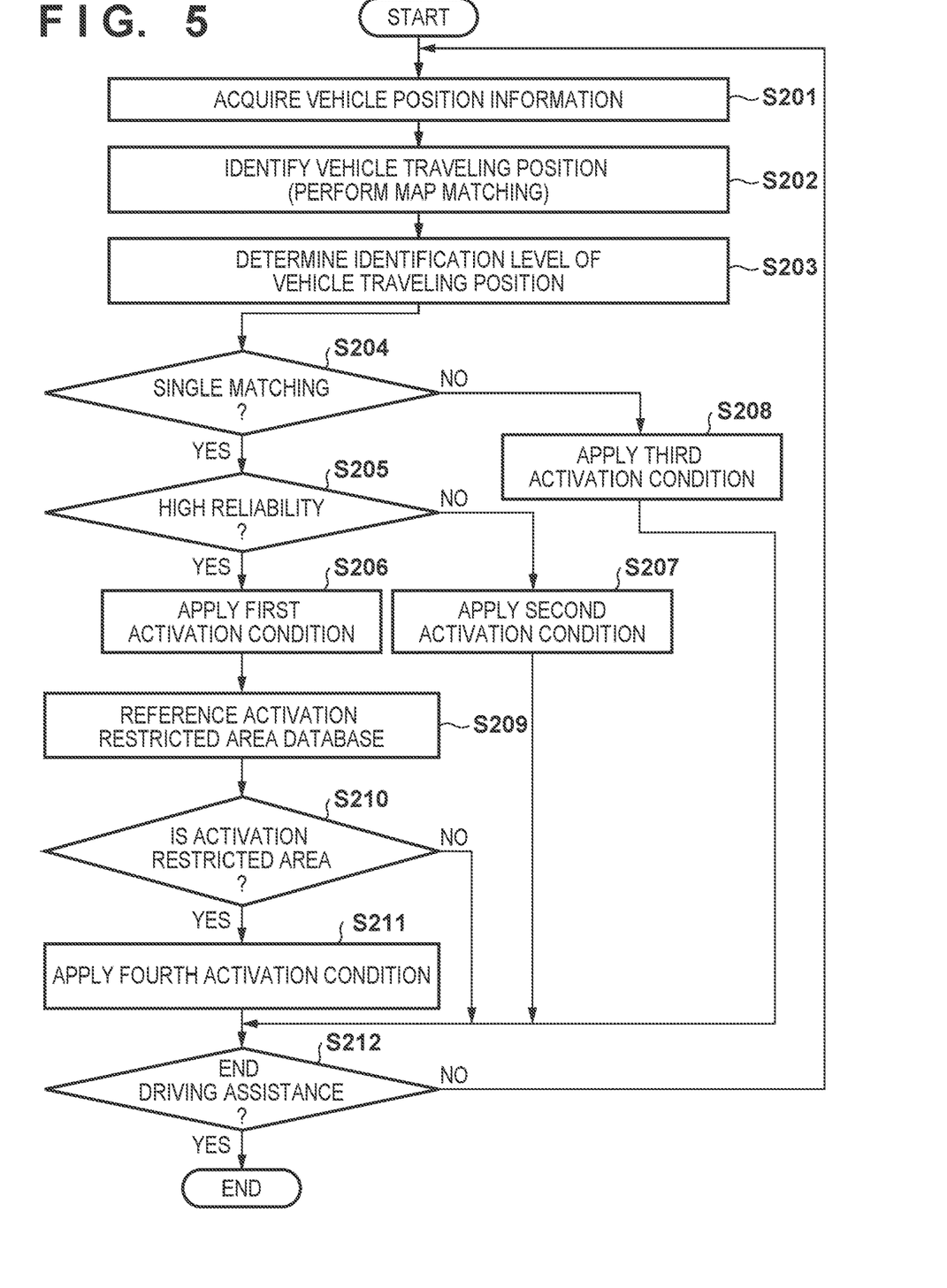
FIG. 5 is a flowchart illustrating a method for setting an activation condition used for the driving assistance process.

Next, the setting of the activation condition used for the driving assistance process of FIG. 4 will be described. FIG. 5 is a flowchart illustrating a method for setting an activation condition used for the driving assistance process. The flowchart of FIG. 5 can be performed by the processing unit 140, when the driving assistance program is executed in the vehicle control apparatus 100. In addition, the flowchart of FIG. 5 can be implemented in parallel with and independently of the flowchart of FIG. 4.

In step S201, the processing unit 140 (the identification unit 142) acquires, from the position detection unit 120, information (position information) indicating the current position of the vehicle V that has been detected by the position detection unit 120. Next, in step S202, the processing unit 140 (the identification unit 142) performs a known map matching process, based on the position information acquired in step S201 and the map information stored in the database 28*a*, and thus identifies the traveling position (traveling road) of the vehicle V.

In step S203, the processing unit 140 (the determination unit 143) determines an identification level (reliability) of the traveling position of the vehicle V that has been determined by the identification unit 142. In the present embodiment, the processing unit 140 determines the identification level of the traveling position of the vehicle V that has been identified by the identification unit 142, based on a table illustrated in FIG. 3. Next, in step S204, the processing unit 140 (the determination unit 143) determines whether the identification level of the traveling position of the vehicle V that has been identified by the identification unit 142 is single matching (identification level 1). In a case where the identification level is the single matching, the process proceeds to step S205, and the processing unit 140 (the determination unit 143) determines whether the identification level in the single matching is high, that is, whether the reliability is high. In the present embodiment, only the identification level 1 is used as the single matching as illustrated in FIG. 3. However, for example, in a case where the single matching is classified into a plurality of identification levels in accordance with a matching error, the present step S205 can be performed.

In a case where the single matching is determined in step S204 and the high reliability is determined in step S205, the process proceeds to step S206, and the processing unit 140 (the assistance control unit 141) applies a first activation condition, as the activation condition of the driving assistance of the vehicle V. For example, in a case where the threshold of the time-to-collision is applied as the activation condition, the threshold as the first activation condition can be set to two seconds. In a case where the first activation condition is applied, the process proceeds to step S209, and the activation condition is set in accordance with whether the vehicle V is located within the activation restricted area.

On the other hand, in a case where the single matching is determined in step S204, but the high reliability is not determined in step S205, the process proceeds to step S207, and the processing unit 140 (the assistance control unit 141) applies a second activation condition as the activation condition of the driving assistance of the vehicle V. The second activation condition is set such that the activation of the driving assistance of the vehicle V is restricted, as compared with the first activation condition. For example, in a case where the threshold of the time-to-collision is applied as the activation condition, the threshold as the second activation condition can be set to 1.5 seconds, with which the activation of the driving assistance is restricted, as compared with the first activation condition. In addition, in a case where the matching that is not the single matching is determined in step S204, the process proceeds to step S208, and the processing unit 140 (the assistance control unit 141) applies a third activation condition as the activation condition of the driving assistance of the vehicle V. The third activation condition is set such that the activation of the driving assistance of the vehicle V is restricted, as compared with the second activation condition. For example, in a case where the threshold of the time-to-collision is applied as the activation condition, the threshold as the third activation condition can be set to 1.2 seconds, with which the activation of the driving assistance is restricted, as compared with the second activation condition. In a case where the second activation condition and the third activation condition are applied, the activation condition is not set in accordance with whether the vehicle V is located within the activation restricted area, and the process proceeds to step S212.

In step S209, the processing unit 140 (the assistance control unit 141) refers to the database of the activation restricted area. As described above, the database of the activation restricted area may be stored in the storage device of the processing unit 140, or may be acquired from a server via the communication device 26a. Next, in step S210, the processing unit 140 (the assistance control unit 141) determines whether the traveling position of the vehicle V is located within the activation restricted area, based on the traveling position of the vehicle V identified in step S202. In a case where the traveling position of the vehicle V is not located within the activation restricted area, the first activation condition is continuously set as the activation condition of the driving assistance of the vehicle V. On the other hand, in a case where the traveling position of the vehicle V is located within the activation restricted area, the process proceeds to step S211, and the processing unit (the assistance control unit 141) applies a fourth activation condition as the activation condition of the driving assistance of the vehicle V. The fourth activation condition is set such that the activation of the driving assistance of the vehicle V is restricted, as compared with the first activation condition. The fourth activation condition may be the same as the second activation condition or the third activation condition.

In step S212, the processing unit 140 determines whether to end the driving assistance of the vehicle V. For example, when the driver turns off the driving assistance of the vehicle V, or when the ignition of the vehicle V is turned off, the processing unit 140 is capable of determining that the driving assistance of the vehicle V ends. In a case where the driving assistance of the vehicle V does not end, the process returns to step S201.

As described above, the vehicle control apparatus 100 in the present embodiment changes the activation condition of the driving assistance of the vehicle V in accordance with the reliability (identification level) of the traveling position of the vehicle V that has been identified by the identification unit 142. Accordingly, even in a case where it is difficult to accurately identify the traveling position of the vehicle V, it is possible to reduce a malfunction of the driving assistance of the vehicle V. That is, the driving assistance of the vehicle V is appropriately activated, and the safety of the vehicle V can be improved.

Here, in the present embodiment, the description has been given for an example in which the activation condition of the driving assistance of the vehicle V is changed in accordance with whether the traveling position of the vehicle V is the single matching (step S204) and whether its reliability is high (step S205). However, the present invention is not limited to this. For example, the activation condition may be changed in accordance with the reliability (identification level) of the traveling position of the vehicle V that has been determined by the determination unit 143. To be specific, the activation condition may be changed such that the activation of the driving assistance of the vehicle V is more restricted as the reliability of the traveling position of the vehicle V becomes lower. In addition, the description "the activation of the driving assistance of the vehicle is restricted" used in the present embodiment may be understood to be "making it difficult to activate the driving assistance of the vehicle". However, it should be noted that the driving assistance is activated within a range in which the safety is compensated, such as the collision avoidance or the like.

Other Embodiments

In addition, a program for achieving one or more functions that have been described in the above embodiment is supplied to a system or an apparatus through a network or a storage medium, and one or more processors in a computer of the system or the apparatus are capable of reading and executing the program. The present invention is also achievable by such an aspect.

Summary of Embodiments

1. A vehicle control apparatus of the above-described embodiment is a vehicle control apparatus (e.g. 100) that controls traveling of a vehicle (e.g. V), comprising:
   a detector (e.g. 110) configured to detect a surrounding situation of the vehicle;
   a control unit (e.g. 141) configured to activate driving assistance of the vehicle in a case where a positional relationship between a target object that has been detected by the detector and the vehicle satisfies an activation condition;

an identification unit (e.g. 142) configured to identify a traveling position of the vehicle; and a determination unit (e.g. 143) configured to determine reliability of the traveling position of the vehicle that has been identified by the identification unit, wherein the control unit changes the activation condition in accordance with the reliability that has been determined by the determination unit.

According to this embodiment, even in a case where it is difficult to accurately identify the traveling position of the vehicle, it is possible to reduce a malfunction of the driving assistance of the vehicle. That is, the driving assistance of the vehicle is appropriately activated, so that the safety of the vehicle can be improved.

2. In the above-described embodiment, the control unit changes the activation condition such that an activation of the driving assistance is more restricted as the reliability is lower.

According to this embodiment, it is possible to reduce the malfunction of the driving assistance of the vehicle that is likely to occur as the traveling position of the vehicle is not accurately identified.

3. In the above-described embodiment, the determination unit determines, as the reliability, whether a traveling road of the vehicle has been identified by the identification unit, and the control unit changes the activation condition between a case where the traveling road of the vehicle has not been identified and a case where the traveling road of the vehicle has been identified, based on a result of the determination by the determination unit.

According to this embodiment, it becomes possible to appropriately activate the driving assistance of the vehicle in accordance with whether the traveling road of the vehicle has been identified.

4. In the above-described embodiment, in the case where the traveling road of the vehicle has not been identified, the control unit changes the activation condition such that the activation of the driving assistance is more restricted, as compared with a case where a road on which the vehicle is traveling has been identified.

According to this embodiment, it is possible to reduce the malfunction of the driving assistance of the vehicle that is likely to occur when the traveling road of the vehicle is not identified.

5. In the above-described embodiment, the activation condition includes that an index indicating the positional relationship has reached a threshold, and the control unit changes the threshold in accordance with the reliability that has been determined by the determination unit.

According to this embodiment, in a case where the driving assistance is conducted, based on the index indicating the positional relationship between the target object that has been detected and the vehicle, the threshold is changed, so that the driving assistance for the vehicle can be appropriately activated.

6. In the above-described embodiment, the control unit changes the activation condition in accordance with whether the traveling position of the vehicle that has been identified by the identification unit is located within an area where the activation of the driving assistance is to be restricted.

According to this embodiment, it is possible to reduce the activation of the driving assistance for a target object that is not originally the one for activating the driving assistance.

7. In the above-described embodiment, the driving assistance includes deceleration assistance of the vehicle and/or a notification that deceleration of the vehicle is necessary.

According to this embodiment, it becomes possible to appropriately activate the deceleration assistance and/or a notification of deceleration of the vehicle as the driving assistance.

The invention is not limited to the foregoing embodiments, and various variations/changes are possible within the spirit of the invention.

What is claimed is:

1. A vehicle control apparatus that controls traveling of a vehicle, comprising:

a detector configured to detect a surrounding situation of the vehicle;

a control unit configured to activate driving assistance of the vehicle in a case where a positional relationship between a target object that has been detected by the detector and the vehicle satisfies an activation condition;

an identification unit configured to identify a traveling position of the vehicle; and a determination unit configured to determine reliability of the traveling position of the vehicle that has been identified by the identification unit, wherein the control unit changes the activation condition in accordance with the reliability that has been determined by the determination unit.

2. The vehicle control apparatus according to claim 1, wherein the control unit changes the activation condition such that an activation of the driving assistance is more restricted as the reliability is lower.

3. The vehicle control apparatus according to claim 1, wherein the determination unit determines, as the reliability, whether a traveling road of the vehicle has been identified by the identification unit, and the control unit changes the activation condition between a case where the traveling road of the vehicle has not been identified and a case where the traveling road of the vehicle has been identified, based on a result of the determination by the determination unit.

4. The vehicle control apparatus according to claim 3, wherein, in the case where the traveling road of the vehicle has not been identified, the control unit changes the activation condition such that the activation of the driving assistance is more restricted, as compared with a case where a road on which the vehicle is traveling has been identified.

5. The vehicle control apparatus according to claim 1, wherein the activation condition includes that an index indicating the positional relationship has reached a threshold, and the control unit changes the threshold in accordance with the reliability that has been determined by the determination unit.

6. The vehicle control apparatus according to claim 1, wherein the control unit changes the activation condition in accordance with whether the traveling position of the vehicle that has been identified by the identification unit is located within an area where the activation of the driving assistance is to be restricted.

7. The vehicle control apparatus according to claim 1, wherein the driving assistance includes deceleration assistance of the vehicle and/or a notification that deceleration of the vehicle is necessary.

8. A vehicle control method for controlling traveling of a vehicle, comprising:
   detecting a surrounding situation of the vehicle;
   activating driving assistance of the vehicle in a case where a positional relationship between a target object that has been detected by the detecting and the vehicle satisfies an activation condition;
   identifying a traveling position of the vehicle;
   determining reliability of the traveling position of the vehicle that has been identified by the identifying; and
   changing the activation condition in accordance with the reliability that has been determined in the determining.

9. A non-transitory computer-readable storage medium storing a program for causing a computer to execute a vehicle control method according to claim 8.

* * * * *